United States Patent Office 2,905,625
Patented Sept. 22, 1959

2,905,625

PURIFICATION OF HYDROCARBON FRACTIONS

Charles V. Berger, Western Springs, Ill., assignor, by mesne assignments, to Universal Oil Products Company, Des Plaines, Ill., a corporation of Delaware No Drawing. Application July 9, 1956
Serial No. 596,443

8 Claims. (Cl. 208—89)

This application is a continuation-in-part of application Serial No. 436,980, filed June 15, 1954, and relates to the purification of hydrocarbon fractions and more particularly to effecting the purification in the presence of supported catalysts.

Many hydrocarbon fractions contain impurities to an extent that the hydrocarbon fractions do not meet certain specifications and, therefore, cannot be marketed as higher grade products, or these impurities interfere with subsequent conversion of the hydrocarbon fractions. These impurities, in general, comprise those containing sulfur, nitrogen, oxygen and/or certain metallic constituents. For example, certain aromatic solvents or certain gasolines must meet specifications on maximum sulfur content, etc. before they can be sold at a premium price. As another example, certain gasoline or naphtha fractions contain sulfur, nitrogen, oxygen and/or other impurities which may deactivate noble metal catalysts and it is, therefore, necessary to pretreat the gasoline or naphtha fractions before subjecting the same to reforming in the presence of the noble metal catalysts.

In treating the hydrocarbon fractions to eliminate the undesirable impurities, it has been found that catalysts comprising a refractory support and compounds of certain metals are particularly effective.

In one embodiment the present invention relates to a method of purifying a hydrocarbon fraction which comprises contacting said hydrocarbon fraction at purification conditions with a catalyst comprising a refractory oxide and an oxide and/or sulfide of molybdenum, tungsten and nickel.

Any suitable refractory oxide or mixtures of refractory oxides may be used in accordance with the present invention. Alumina appears to be a particularly preferred refractory oxide. Other refractory oxides include the oxides of silicon, magnesium, zinc, zirconium, titanium, hafnium, thorium, or mixtures thereof.

The refractory oxide may be prepared in any suitable manner. For example, alumina may be prepared by commingling a suitable basic compound, including ammonium hydroxide, ammonium carbonate, etc., with an acidic salt of aluminum, including the chloride, bromide, iodide, fluoride, sulfate, nitrate, phosphate, etc., and precipitating aluminum hydroxide which, upon drying, is converted to alumina. In another embodiment alumina may be prepared by commingling a suitable acid, including sulfuric acid, phosphoric acid, nitric acid, oxalic acid, acetic acid, hydrochloric acid, hydrofluoric acid, hydrobromic acid, hydroiodic acid, etc., with a basic aluminum salt including alkali metal aluminates, for example, sodium aluminate, potassium aluminate, etc., alkaline earth metal aluminates, including calcium aluminate, strontium aluminate, etc.

Other inorganic oxides may be prepared in a similar manner or according to conventional procedures. For example, silica may be prepared by commingling a suitable acid with water glass or other alkaline silicate.

The inorganic oxide may be formed as the wet cake which subsequently is dried, formed into particles of definite size and shape in any suitable manner including, for example, grinding, pelleting, extruding, etc., and when desired the particles are calcined. In another method, the inorganic oxide may be formed into spheroids by spray drying, the oil drop method in which a sol is passed as droplets into oil or other immiscible liquid maintained at an elevated temperature, etc.

It is understood that mixtures of inorganic oxides may be prepared by coprecipitation methods, in which two or more oxides are formed simultaneously in a manner similar to that as hereinbefore set forth for the preparation of the inorganic oxide. In another embodiment, one inorganic oxide is prepared and then is composited with one or more other inorganic oxides by successive precipitation method or by separate precipitation and subsequent admixture. For example, silica-alumina composites may be prepared by coprecipitation methods, or the silica first is formed and then is commingled with a suitable aluminum compound and a precipitating agent is added or the mixture is heated to form the silica-alumina composite.

While synthetically prepared inorganic oxides are generally preferred, it is understood that naturally occurring inorganic oxides or a mixture of oxides may be employed, including clays such as feldspar, bauxite, kaolin, fuller's earth, kieselguhr, montmorillonite, bentonite, Attapulgus clay, etc., which usually are acid or otherwise treated.

In accordance with the present invention, molybdenum, tungsten and nickel are composited with the support. In general, the oxides of these metals are preferred, although other compounds of these metals may be employed and particularly the sulfides. The preferred catalyst comprises alumina-molybdenum oxide-tungsten oxide-nickel oxide. Other catalyst composites include silica-alumina-molybdenum oxide-tungsten oxide-nickel oxide, silica-zirconia-molybdenum oxide-tungsten oxide-nickel oxide, silica-magnesia-molybdenum oxide-tungsten oxide-nickel oxide, etc.

The support comprising the refractory oxide or oxides will consist of a major proportion of the catalyst and may range from about 50% to about 90% or more of the catalyst composition. The remaining components will be in a concentration of from 10% to about 50% of the final catalyst. In many cases the other components are present in equal concentrations, although they may be present in proportions of 20 parts of one to one part of the other.

The final catalyst composite may be prepared in any suitable manner including separate, successive or coprecipitation methods. In a preferred method, the support comprising the inorganic oxide or oxides is separately prepared, dried at a temperature of from about 200° to about 600° F. for 2 to 24 hours or more, formed into particles of definite size and shape, and the particles calcined at a temperature of from about 600° to about 1800° F. The other components then are composited with the calcined support in any suitable manner and either all at one time or each one separately. In one method an impregnating solution of the other components is prepared and the support particles are soaked or dipped therein in order to obtain the desired impregnation. The concentration of the impregnating solution and the proportion of the components therein are selected so that the final catalyst will contain these components in the desired concentrations. In another method, an impregnating solution of one component is prepared, and the support particles are soaked therein, after which the particles are dried and calcined and then are impregnated with the other components, after which the final composite is dried and calcined. The impregnating solution may be acidic or basic and, when desired, a suitable acid, including sulfuric acid, phosphoric acid, nitric acid, hydrochloric acid, hydrofluoric acid, oxalic acid, acetic acid, etc. or a mixture thereof, or a suitable basic compound, including ammonium hydroxide, ammonium carbonate, etc. or a mixture thereof may be added to the impregnating solution. In another method, the final composite may be formed by suitable physical admixing of the oxides in a wet state, followed by drying of the composite. In still another method, the support may be commingled with a compound of the other components and the oxides thereof developed by subsequent heating of the composite. Any suitable method of forming the composite and any suitable soluble compounds of the metals may be employed in accordance with the present invention.

It is understood that the various catalysts which may be prepared by the different methods hereinbefore set forth are not necessarily equivalent. However, all of them will serve to effect improvement of the hydrocarbon fraction.

In another embodiment, the catalyst comprises the inorganic oxide support and the sulfides of the other components. The sulfide catalyst is readily obtained by subjecting the composite containing the oxides to sulfidation in any suitable manner. In one method the sulfiding is effected by passing hydrogen sulfide through the composite, preferably at an elevated temperature which may range from about 500° to 1100 F. or more for a sufficient time to effect substantially complete sulfidation, which can be determined by continuing the treatment until there is no further absorption of hydrogen sulfide. In another embodiment, the composite containing the oxides may be utilized at an elevated temperature for the treatment of a hydrocarbon fraction containing sulfur compounds and thereby convert the oxides to the sulfides in situ.

In the embodiment of the invention set forth in the previous paragraph, the preferred catalyst will comprise alumina-molybdenum sulfide-tungsten sulfide-nickel sulfide. Other catalysts include silica-alumina-molybdenum sulfide-tungsten sulfide-nickel sulfide, silica-zirconia-molybdenum sulfide-tungsten sulfide-nickel sulfide, silica-magnesia-molybdenum sulfide-tungsten sulfide-nickel sulfide, etc.

As hereinbefore set forth, the catalysts of the present invention are used for the purification of hydrocarbon fractions including gasoline, kerosene, aromatic solvents, diesel fuel, stove oil, lube oil, transformer oil, insulating oil, fuel oil, etc. It is particularly suitable for the treatment of gasoline, which may be substantially saturated and thus may comprise straight run gasoline, natural gasoline, etc. or mixtures thereof, or it may be an unsaturated gasoline such as thermally cracked gasoline, etc., or mixtures of saturated and unsaturated gasolines. The gasoline may be a full boiling range gasoline or any selected fraction thereof, the latter generally being referred to as naphtha and usually comprising the higher boiling fraction.

In one embodiment of the invention, purification of the gasoline is effected prior to reforming of the gasoline in the presence of a catalyst containing a noble metal. Sulfur compounds, including mercaptans, sulfides, etc., are undesired impurities in gasoline which deactivate the reforming catalyst, and these impurities are effectively removed or reduced by treatment in accordance with the present invention. Another harmful impurity present in many gasolines is arsenic or arsenic compounds, which impurity also is effectively removed or reduced by treatment with the catalyst of the present invention. Still other impurities are nitrogen compounds and oxygen compounds. The catalyst of the present invention also effectively reduces the nitrogen and oxygen contents of the gasoline and thereby avoids the harmful effects thereof on the reforming catalyst.

Although the catalyst of the present invention will have a long life, it may be necessary to regenerate the catalyst after long periods of service. The regeneration may be effected by treatment with air or other oxygen-containing gas to burn the carbonaceous deposits therefrom. In general, it is preferred to control the regeneration temperature not to exceed about 1200° F. In some cases it may be desirable to follow the burning operation with treatment with a hydrogen-containing gas at a temperature of from about 700° to about 1200° F., or the reverse procedure may be used.

As hereinbefore set forth, these catalysts are particularly suitable for use in the treatment of gasoline or fractions thereof. This treatment is generally effected at a temperature of from about 500° to about 800° F., although in some cases higher temperatures up to 850°–900° F. may be employed. Atmospheric and preferably superatmospheric pressures ranging from 50 to 5000 pounds or more per square inch may be utilized. The pretreatment preferably is effected in the presence of hydrogen, which may be introduced from an extraneous source or recycled within the process. The concentration of hydrogen will vary with the concentration of sulfur compounds, nitrogen compounds and other impurities contained in the gasoline and also whether the gasoline is a saturated or unsaturated gasoline. The amount of hydrogen may range from about 20 to 10,000 or more cubic feet per barrel of gasoline. In general, greater concentrations of hydrogen will be used when treating cracked gasoline in order to also hydrogenate the olefins contained therein and thereby produce a substantially saturated gasoline which is preferred as charging stock to the reforming process. In such cases, up to 25,000 cubic feet of hydrogen per barrel of gasoline or even more may be employed. When using a large concentration of hydrogen, it is generally preferred to recycle the hydrogen within the process. The impurity content of the gas stream being recycled in such cases will be small in comparison to the hydrogen content thereof, and the gas stream may be recycled with little or only a light treatment to purify the gas stream to remove the impurities.

Another embodiment of the invention comprises a combination process in which gasoline is subjected to pretreatment in the manner hereinbefore set forth, and the treated gasoline is subjected to reforming in the presence of a catalyst containing a noble metal. A particular advantage to this combination process is that the reforming operation will produce an excess of hydrogen over that required in the reforming operation, and the excess hydrogen may be utilized in the pretreatment step, thereby resulting in a combination process wherein the steps are mutually interdependent, the first step providing an improved charging stock for the second step and the second step providing hydrogen for use in the first step.

The reforming process generally is effected at a temperature of from about 700° to 1100° F., or more, a pressure within the range of from about 50 to 3000 pounds per square inch or more, and a weight hourly space velocity (defined as the weight of oil per hour per weight of catalyst in the reaction zone) of from about 0.1 to about 20 or more. The reforming preferably is effected in the presence of hydrogen, which may be introduced from an extraneous source or recycled from within the process. In a preferred operation, sufficient hydrogen will be produced in the reforming operation to furnish the hydrogen required in the process, as well as that utilized in the pretreating step and, therefore, it may be unnecessary to introduce hydrogen from an extraneous source. In general, the concentration of hydrogen in the reforming zone will be within the range of from about 0.5 to 20 mols or more of hydrogen per mol of hydrocarbon. Any suitable reforming catalyst may be employed and, as hereinbefore set forth, the pretreatment of the gasoline is particularly advantageous when the reforming catalyst contains a noble or expensive metal including platinum, rhodium, palladium, ruthenium, osmium, iridium, silver, gold, etc. A particularly preferred catalyst comprises alumina, from about 0.01% to about 10% by weight of platinum and from about 0.1% to about 10% by weight of halogen.

The process of the present invention may be effected in any suitable equipment. A particularly suitable process comprises the well-known fixed bed system in which the catalyst is disposed in a reaction zone and the hydrocarbons to be treated are passed therethrough in either upward or downward flow. The products are fractionated to separate hydrogen and to recover the desired products. As hereinbefore set forth, the hydrogen preferably is utilized in both the pretreating and reforming operations. Other suitable units in which the process may be effected include the fluidized type in which the hydrocarbons and catalyst are maintained in a state of turbulence under hindered settling conditions in a reaction zone, the fluidized-fixed bed type in which the reaction is effected in a manner similar to the fluidized type but the catalyst is not withdrawn from the reaction zone as in the fluidized type, the compact moving bed type in which the catalyst and hydrocarbons are passed either concurrently or countercurrently to each other, and the suspensoid type of operation in which the catalyst is carried into a reaction zone as a slurry in the hydrocarbon oil.

In one embodiment the effluent gas from the pretreating step may be treated to separate hydrogen from hydrogen sulfide, ammonia, etc., and the resultant hydrogen may be utilized in either the pretreating or reforming steps of the process. In another embodiment the effluent gas from the pretreating step may be continuously or intermittently withdrawn from the process and, in this manner the objectionable sulfur, nitrogen or other compounds are removed from the process in the form of hydrogen sulfide, ammonia, etc.

The following examples are introduced to illustrate further the novelty and utility of the present invention, but not with the intention of unduly limiting the same.

*Example I*

The catalyst of this example comprises alumina, 12% by weight molybdenum oxide, 3% by weight nickel oxide and 8% by weight tungsten oxide. The alumina is prepared by commingling ammonium hydroxide with aluminum chloride to form aluminum hydroxide, washing with ammoniated water to remove soluble impurities, drying the aluminum hydroxide at 400° F. for 16 hours, forming the resultant alumina into pellets, and calcining the pellets at 1400° F. for 6 hours. An impregnation solution of molybdic acid, ammonium tungstate and nickel nitrate is prepared to contain the molybdenum, tungsten and nickel in the desired proportions. The alumina pellets are soaked in the impregnating solution for a time sufficient to produce a final catalyst containing the desired amount of these components. The composite then is withdrawn from excess solution, dried at a temperature of 300° F. for 8 hours and calcined at 1200° F. for 3 hours.

The catalyst prepared in the above manner is utilized for the purification of a Mid-Continent straight run naphtha at a temperature of 750° F. and a pressure of 800 pounds per square inch in the presence of hydrogen at a hydrogen to hydrocarbon mol ratio of 5:1. This treatment serves to reduce the impurities contained in the naphtha, as well as to hydrogenate olefinic constituents present in the naphtha.

*Example II*

In another method the catalyst described in Example I is sulfided prior to use by passing perfluent hydrogen sulfide therethrough at a temperature of 750° F. in order to at least partially convert the molybdenum, tungsten and nickel oxides to the corresponding sulfides, and the resultant catalyst then is utilized for the purification of gasoline or naphtha.

*Example III*

A catalyst comprising the oxides of silicon, aluminum, molybdenum, tungsten and nickel is prepared by first forming a silica-alumina composite, adding thereto an aqueous solution of ammonium molybdate, followed by the addition of an aqueous solution of ammonium tungstate and an aqueous solution of nickel nitrate, after which the composite is dried at a temperature of 250° F. for 18 hours and calcined at a temperature of 1300° F. for 4 hours. These components are utilized in concentrations to form a final catalyst containing 75% by weight of silica, 12% by weight of alumina, 7% by weight of molybdenum, 4% by weight of tungsten and 2% by weight of nickel.

This catalyst is utilized at a temperature of 800° F. and a pressure of 500 pounds in the presence of hydrogen for pretreating a straight run naphtha prior to reforming the same in the presence of a platinum-containing catalyst. Hydrogen separated from the effluent products of reforming is recycled in part to reforming and in part to the pretreating step.

I claim as my invention:

1. In the catalytic purification of a hydrocarbon fraction, the improvement which comprises contacting said hydrocarbon fraction with a catalyst comprising an inorganic oxide support, molybdenum compound, tungsten compound, and nickel compound, said inorganic oxide support being in a concentration of from about 50 to about 90% by weight of the final catalyst and the total content of said molybdenum, tungsten and nickel compounds being at least 10% by weight.

2. In the catalytic purification of a hydrocarbon fraction, the improvement which comprises contacting said hydrocarbon fraction with a catalyst comprising an inorganic oxide support, molybdenum oxide, tungsten oxide and nickel oxide, said inorganic oxide support being in a concentration of from about 50 to about 90% by weight of the final catalyst and the total content of said molybdenum, tungsten and nickel oxides being at least 10% by weight.

3. In the catalytic purification of a hydrocarbon fraction, the improvement which comprises contacting said hydrocarbon fraction with a catalyst comprising an inorganic oxide support, molybdenum sulfide, tungsten sulfide and nickel sulfide, said inorganic oxide support being in a concentration of from about 50 to about 90% by weight of the final catalyst and the total content of said molybdenum, tungsten and nickel sulfides being at least 10% by weight.

4. The method of purifying a gasoline fraction to remove sulfur and nitrogen impurities contained therein, which comprises treating said gasoline fraction at a temperature of from about 500° to about 900° F. with hydrogen and a catalyst comprising alumina, molybdenum oxide, tungsten oxide and nickel oxide, said alumina being in a concentration of from about 50 to about 90% by weight of the final catalyst and the total content of said molybdenum, tungsten and nickel oxides being from about 10 to about 50% by weight.

5. The method of purifying a gasoline fraction to remove sulfur and nitrogen impurities contained therein, which comprises treating said gasoline fraction at a temperature of from about 500° to about 900° F. with hydrogen and a catalyst comprising alumina, molybdenum sulfide, tungsten sulfide and nickel sulfide, said alumina being in a concentration of from about 50 to about 90% by weight of the final catalyst and the total content of said molybdenum, tungsten and nickel sulfides being from about 10 to about 50% by weight.

6. The method of improving a gasoline fraction containing impurities which deactivate noble metal catalysts, which comprises removing said impurities by treating said gasoline fraction at a temperature of from about 500° to about 900° F. with hydrogen and a catalyst comprising an inorganic oxide support, molybdenum compound, tungsten compound and nickel compound, said inorganic oxide support being in a concentration of from about 50 to about 90% by weight of the final catalyst and the total content of said molybdenum, tungsten and nickel compounds being at least 10% by weight, reforming the thus treated gasoline fraction in the presence of a catalyst containing a noble metal and at hydrogen-producing conditions, separating the resultant hydrogen from the reformed gasoline and supplying at least a portion thereof to the first-mentioned step.

7. The method of improving a gasoline fraction containing impurities which deactivate platinum catalysts, which comprises removing said impurities by treating said gasoline fraction at a temperature of from about 500° to about 900° F. with hydrogen and a catalyst comprising alumina, molybdenum oxide, tungsten oxide and nickel oxide, said alumina being in a concentration of from about 50 to about 90% by weight of the final catalyst and the total content of said molybdenum, tungsten and nickel oxides being at least 10% by weight, reforming the thus treated gasoline fraction in the presence of a platinum catalyst and at hydrogen-producing conditions, separating the resultant hydrogen from the reformed gasoline and supplying at least a portion thereof to the first-mentioned step.

8. The method of improving a gasoline fraction containing impurities which deactivate platinum catalysts, which comprises removing said impurities by treating said gasoline fraction at a temperature of from about 500° to about 900° F. wth hydrogen and a catalyst comprising alumina, molybdenum sulfide, tungsten sulfide and nickel sulfide, said alumina being in a concentration of from about 50 to about 90% by weight of the final catalyst and the total content of said molybdenum, tungsten and nickel sulfides being at least 10% by weight, reforming the thus treated gasoline fraction in the presence of a platinum catalyst and at hydrogen-producing conditions, separating the resultant hydrogen from the reformed gasoline and supplying at least a portion thereof to the first mentioned step.

References Cited in the file of this patent
UNITED STATES PATENTS

| | | |
|---|---|---|
| 2,487,466 | Nahin | Nov. 8, 1949 |
| 2,547,380 | Fleck | Apr. 3, 1951 |
| 2,687,370 | Hendricks | Aug. 24, 1954 |
| 2,700,014 | Anhorn et al. | Jan. 18, 1955 |
| 2,744,052 | Nozaki | May 1, 1956 |
| 2,769,761 | Annable et al. | Nov. 6, 1956 |
| 2,774,719 | Johanson | Dec. 18, 1956 |